G. A. LANE.
GAS METER.
APPLICATION FILED JAN. 9, 1919.
1,347,340.
Patented July 20, 1920.
4 SHEETS—SHEET 4.
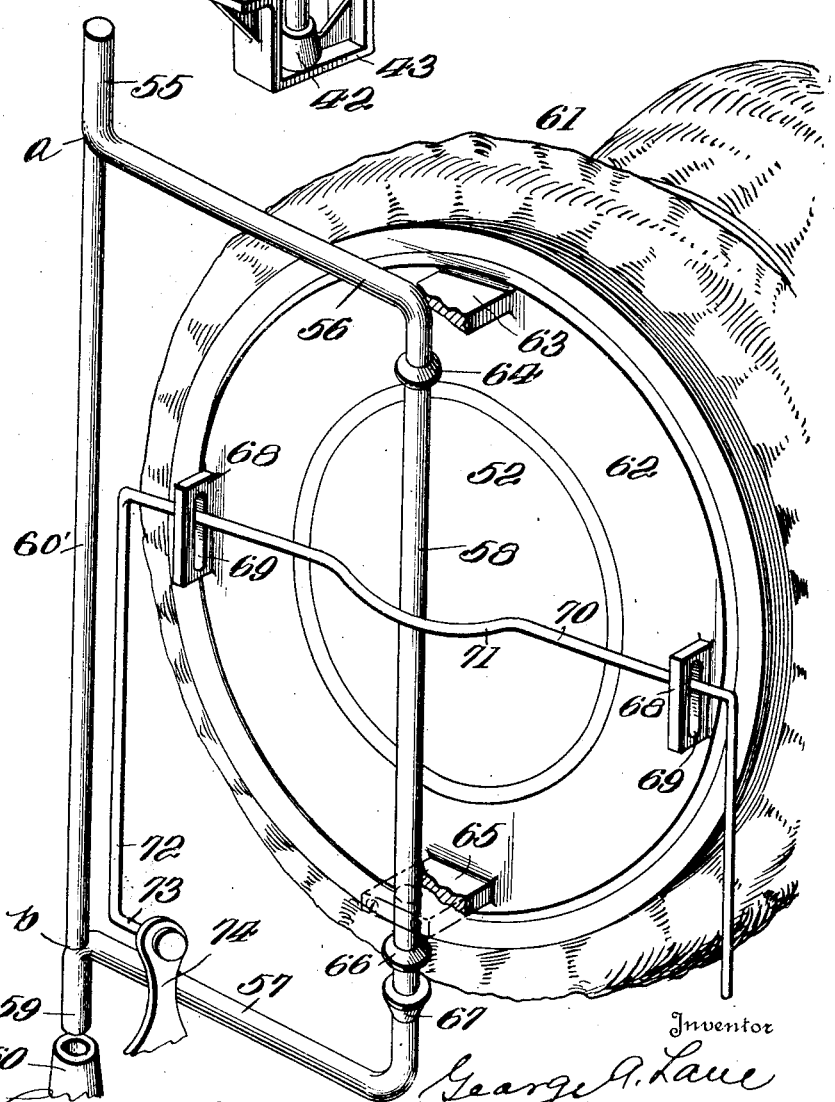

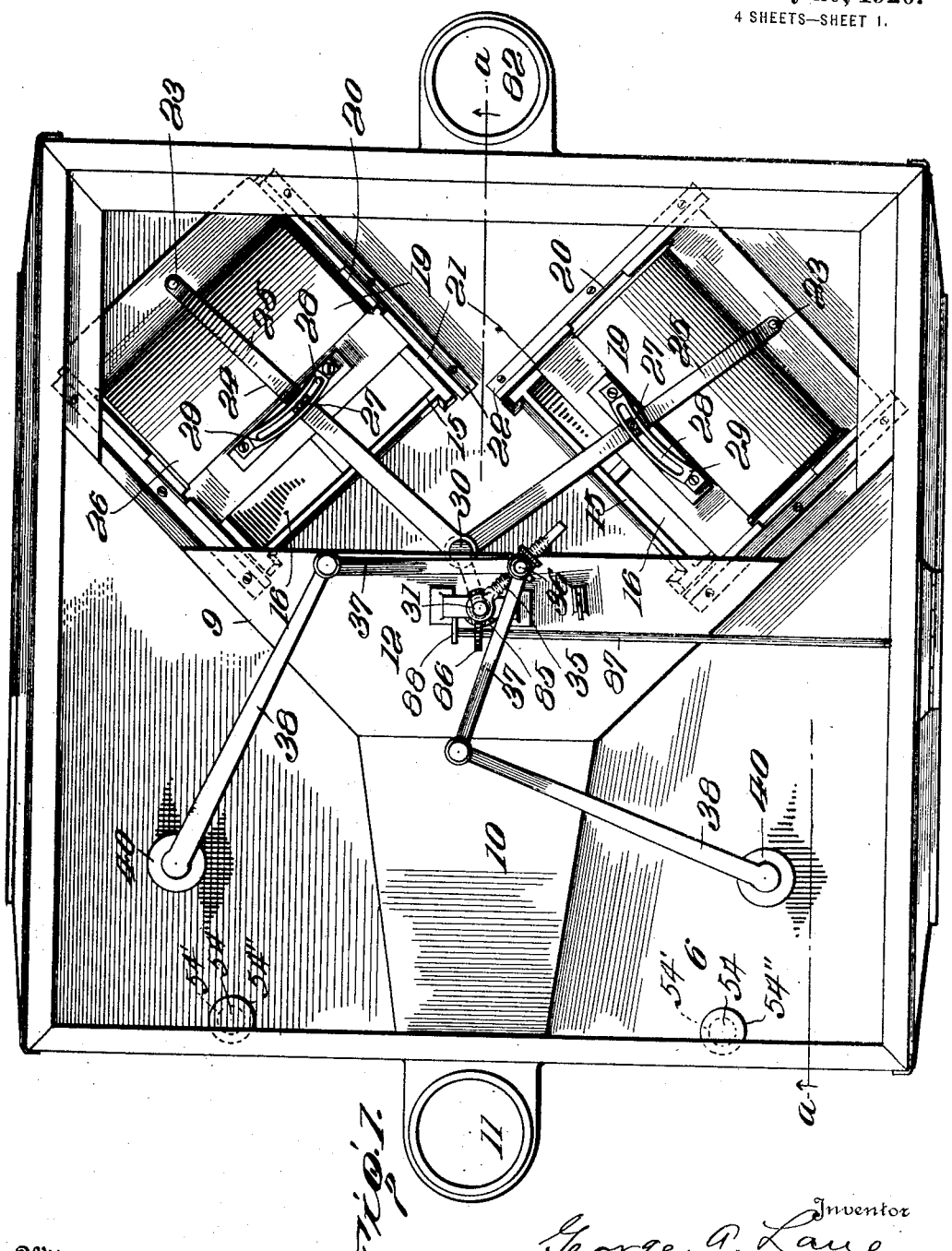

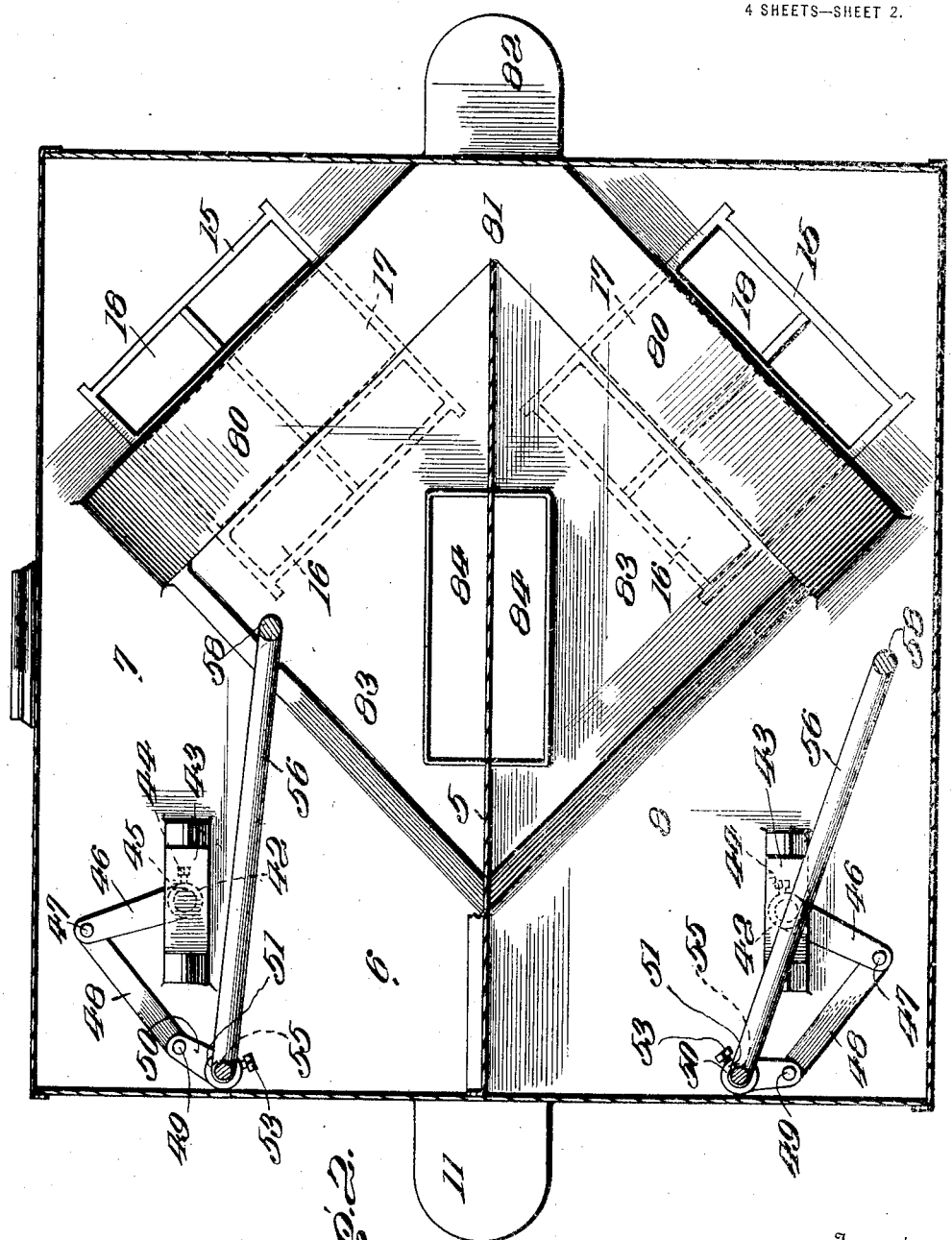

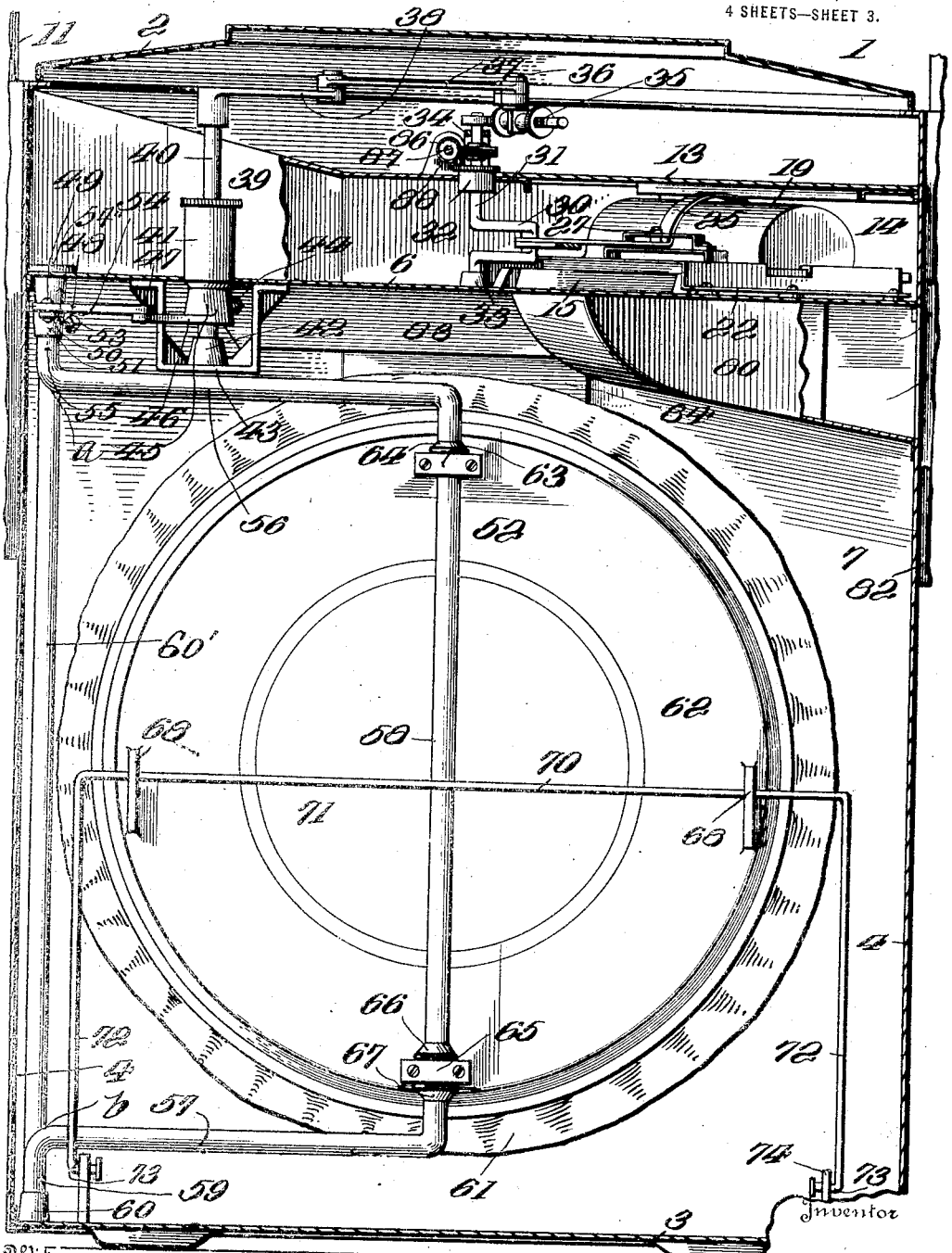

UNITED STATES PATENT OFFICE.

GEORGE A. LANE, OF CHICAGO, ILLINOIS, ASSIGNOR TO AMERICAN METER COMPANY, INCORPORATED, OF NEW YORK, N. Y., A CORPORATION OF DELAWARE.

GAS-METER.

1,347,340.   Specification of Letters Patent.   Patented July 20, 1920.

Application filed January 9, 1919. Serial No. 270,301.

*To all whom it may concern:*

Be it known that I, GEORGE A. LANE, a citizen of the United States, residing at Chicago, in the county of Cook and State of Illinois, have invented certain new and useful Improvements in Gas-Meters, of which the following is a specification.

This invention relates to improvements in dry-type gas meters, and more particularly to a novel flagstaff arrangement for use in connection with double diaphragm meters.

The primary object of the invention is to so construct the flagstaffs that they will not interfere with the stroke of the diaphragms, and to permit a much longer stroke for the diaphragms than has heretofore been possible, and at the same time, do away, to a very considerable extent, with the lateral movement or thrust of the diaphragms in operation.

In the usual meter constructions, the flagstaff has been vertical and continuous, and mounted on the valve table, and stepped in steps or sockets on the floor or bottom of the meter. With such an arrangement, the flagstaffs had to be considerably removed toward one side of the meter, so as not to interfere with the expansion of the diaphragms, thus with such an arrangement, limiting to a great extent, the size of the diaphragm that can successfully be used in a given meter.

In the construction about to be described, I divide the flagstaff into two sections, the upper section being allowed to remain in the same or usual position above the valve table, while the second section below the valve table is in changed position or out of alinement with the upper section, which arrangement allows the second or lower section to be placed at any desired point to bring about coördination with the first section, while, at the same time, permitting a longer stroke of the diaphragm. The first section is, in my arrangement, so positioned on the valve table as to retain the usual regulation short stroke, on the arm of the flagstaff above the table, that is to say, the same stroke as is incident to present type meters, and also to retain the necessary angular relation of position between the flagstaffs and crank center of the meter.

In the drawings—

Figure 1 is a top view of a meter with the top plate removed, and a portion of the housing supported by the valve table also removed, showing the valves in plan.

Fig. 2 is an inverted plan view of Fig. 1, being a horizontal section taken below the valve table.

Fig. 3 is a front view of a meter, with the front plate removed, showing the contained mechanism in elevation.

Fig. 4 is a grouped perspective view of the diaphragm, flagstaff, and related parts.

In the drawings, the numeral 1 designates the meter casing, of usual rectangular shape, formed with top 2, bottom 3, and sides 4. The casing is divided by a central partition 5 which forms, below the valve table 6, diaphragm compartments 7 and 8. Supported by the valve table is a housing 9, communicating through a channel 10, with the intake opening 11. The top of the housing proper is formed by the part 12 and a plate 13 which as shown in Fig. 3, completes the housing and when in position, forms in and around the valves an air tight gas chamber 14. The numeral 15 designates two valve seats arranged upon the valve table in the usual 90° or quadrant relationship. These seats are provided with diaphragm ports 16, outlet ports 17, and casing ports 18, as usual, and the valves are completed by valve covers 19 arranged to slide on the valve seats. These covers are provided with laterally extending flanges 20, which underlie the angle portions 21 of guide bars 22, parallel with the sides of the valves. Pivotally connected with the valve covers at their rear edges, as indicated at 23, are valve arms 24 which are bowed as indicated at 25, to conform to the shape of the dome portions 26 of the valve covers, and where the arms dip down at the inner edges of the cover, they are each provided with an antifriction roller 27, adapted for travel in a curved slot 28 in a guide bracket 29, securely fastened to the inner flanges of the cover. However, while this valve cover and valve arm guide are believed to be of novel and advantageous construction, they need not be further dwelt upon in this application, as the improvements form the subject matter of another application filed January 19, 1919, Serial Number 270,303.

The inner ends of the valve arms are connected in the usual manner with the crank 30, of the operating shaft 31, which passes through a suitable stuffing box 32 in the top of the housing 9, and has a bearing at its lower end in a step 33 supported on the valve table. The operating shaft is further supported and steadied in a bracket 34, also supported on the top of the housing, and to the upper end of the shaft is connected the usual threaded tangent 35, having thereon the adjusting nut 36 to which are pivotally connected the links 37 of the arms 38 of the upper sections 39 of the flagstaffs. It is at this point that the construction illustrated differs very materially and essentially from meters of ordinary construction.

This upper section comprises a short shaft 40, to the upper end of which the flag arm 38 is connected and it extends through a suitable stuffing box 41 supported in the valve table, and its lower end is stepped in a step 42 supported by a bracket 43, soldered or otherwise secured to the under side of the valve table, and interposed between the stuffing box and the step, and held in proper position thereon, by a set screw 44, is a boss or sleeve 45 having an arm 46 integral therewith, and to the outer end of this arm is pivoted as indicated at 47, a link 48, which in turn is pivotally connected at 49 with a shorter arm 50 integral with a boss 51 held in proper position on the upper end of the flagstaff 52, by a set screw 53.

The upper end of the flagstaff section 55—60' is stepped in a socket in a thimble 54, which extends through an aperture 54' in the valve table, and above the table the thimble is provided with a flanged head 54'', by which it is soldered, or otherwise secured to the valve table. The upper vertical part of the composite flagstaff structure is, it will be noted, entirely out of alinement with the upper part 40, but the arm and link connection between the two sections of the staff, compel them to move together for the accomplishment of the purposes of this invention, and in order to translate a comparatively great movement of the lower section of the flagstaff into a comparatively small movement on the part of the upper section, I provide the section 40 of each flagstaff with the long arm 46, and the lower section with a short arm 50, the arrangement being such that the amount of movement of the lower section of the staff will control the movement of the upper section in direct relation to the relative lengths, as described, thus bringing about the usual short stroke of the flag arm above the gas chamber and valve table.

However, while I have shown and described the long arm 46 on the upper section of the staff, and the short arm 50 on the lower section, I desire it understood that I do not confine myself in any way to this precise arrangement, and I may transpose the arms, depending upon the motion requirements of the two sections.

The lower section of the flagstaff is of crank formation and has a vertical portion 55 and upper and lower horizontal portions 56 and 57, and the main vertical portion 58. It is further formed with a short vertical portion 59 at its lower end which is stepped in a step 60 on the bottom plate of the meter, and to strengthen the staff, I prefer to weld to the staff, at the point $a$ at the top, and $b$ at the bottom, a vertical strengthening rod 60'.

The numeral 61 designates a double diaphragm, the inner end of which is connected in the usual manner, to the partition 7, and the outer end of which is closed by a circular plate 62 provided at its top with a laterally extending ear 63, upon which rests a collar 64 formed on the vertical part 58 of the flagstaff, and a similar bracket 65 is provided at the lower part of the plate upon which rests a collar 66, carried by the staff, there being another collar 67 also carried by the staff, that rests below the ear 65, the latter serving to support the diaphragm at the proper distance from the bottom of the meter and the collars otherwise serving to prevent vertical movement of the diaphragm on the staff.

At opposite sides of the diaphragm plate 62, I provide brackets 68 having vertical slots 69 therein, through which passes the horizontal portion 70 of guide wire 71, this guide wire being completed by two vertical portions 72 having their lower ends bent inwardly and headed as indicated at 73, at which point they pass through, and are supported in the upper ends of short standards 74 on the bottom of the meter.

Referring particularly to Fig. 2, the numeral 80 designates two converging outlet channels, that come together at one side of the meter at 81, and which portion of the channels opens into the outlet 82, and the diaphragm channels on each side of the partition are indicated by the numeral 83. These envelop the diaphragm valve ports and lead to two passages 84, one on each side of the partition, which passages lead to a double diaphragm on each side of the partition.

As is usual in gas meters of this type, the operating shaft carries a worm 85 in mesh with a gear 86 carried by dial shaft 87 mounted at one end in a bearing 88, and at the other in the front of the meter, which shaft forms a part of the usual registering mechanism.

The meter is described as designed to accommodate two double diaphragms, one on each side of the partition, which diaphragms are controlled by the valves on the valve table, also on each side of the partition, one valve for each double diaphragm, and consequently the flagstaff and its connections described in detail are duplicated on each side of the partition, as shown best in Figs. 1 and 2.

In operation, assuming for instance the diaphragm port of one valve is in position wherein gas is flowing into the diaphragm, the expansion of the diaphragm will, through one of the flagstaffs 52, impart a movement to the upper section of the flagstaff, through the arm and link connections, and through a flagstaff arm 38 will impart rotary motion to the operating shaft, and while this motion is resulting from the expansion or filling of the diaphragm on one side of the partition, it is exhausting from the other side, causing an oscillation of the other flagstaff sections in the opposite direction, which motion is continuous and alternate, so long as gas is flowing through the meter. Of course the oscillatory motion of the flagstaffs and flag arms and connections, imparts a complete rotary motion to the operating shaft, which, through the valve arms, operates the valves upon their seats, with an overlapping stroke, that is to say for instance, as shown in Fig. 1, the diaphragm port of one valve is approximately half open just before the diaphragm port of the opposite valve is entirely closed, thus bringing about the necessary coördinating reciprocations that result in imparting complete rotary motion to the operating shaft.

Having thus particularly described my invention, what I claim is:

1. In a gas meter, in combination, a meter casing, having diaphragm compartments therein, a valve table, valves on said table, a double diaphragm in each compartment, a flagstaff in each compartment formed in two sections out of alinement with each other, and connections between the two sections whereby the oscillation of one section will communicate similar movement to the other, an operating shaft, connections between the operating shaft and one of the flagstaff sections, whereby a rotary motion is given the shaft upon the expansion and collapse of the diaphragms, and connections between the operating shaft and the valves, whereby the flow of gas into and out of the diaphragms and their compartments is controlled.

2. In a gas meter of the character described, in combinatiotn, a gas-tight meter casing having a partition therein dividing it into diaphragm compartments, a double diaphragm in each compartment, a flagstaff made in two sections out of alinement with each other, one part extending above the valve table and the other below the table, and connections between the sections whereby, when one part is oscillated, a similar movement is communicated to the other section, and suitable connections between the lower section of the flagstaff and the diaphragms, whereby, when the diaphragms are expanded and collapsed, oscillatory movement will be imparted to the lower section, an operating shaft, suitable valves, and connections between the upper portions of the flagstaffs and the operating shaft, and connections between the operating shaft and the valves, whereby, when the sections of the flagstaffs are oscillated, the valves will be reciprocated.

3. In a meter of the character described, in combination, a meter casing having diaphragm compartments therein, a diaphragm in each compartment, a valve table, a flagstaff formed in two sections out of alinement with each other, one section extending above the table and the other below, and connections between the two sections whereby they are caused to oscillate together, an operating shaft, suitable valves, connections between the upper section of the flagstaff and the operating shaft, whereby said shaft is rotated by the movement of the diaphragms, and connections between the valves and the operating shaft, whereby they are reciprocated to control the flow of gas to and from the diaphragms and their compartments.

4. In a gas meter, in combination, a casing having a partition therein dividing it into diaphragm compartments, a valve table, a flagstaff formed in part by a shaft and extending partly above and partly below the valve table, and a second section in the form of a crank and out of alinement with the other section, and located solely below the valve table, connections between the two sections whereby they are caused to oscillate together, a diaphragm in each compartment connected with the lower section, whereby said section is oscillated upon the expansion and collapse of the diaphragms, and suitable valves on the valve table, and connections between the valves and the flagstaffs, whereby the valves are reciprocated for the purpose set forth.

5. In a gas meter, in combination, a casing formed with diaphragm compartments therein, a valve table, a diaphragm in each compartment, a flagstaff having an upper section comprising a short shaft extending partly above and partly below the valve table and carrying a laterally extending arm, and a second section below the valve table and supported beneath the valve table and by the bottom of the meter, and having an upper vertical portion carrying a laterally extending arm, a link connecting the arms of the two flagstaff sections, whereby they are caused to oscillate together, connections between the lower section of the flagstaff and the diaphragms, whereby oscillatory motion is imparted to both sections of the staffs, suitable valves, and connections between the valves and one section of the flagstaff, whereby the valves are reciprocated for control of the gas when the diaphragms expand and collapse.

6. In a gas meter, in combination, a casing having a partition therein dividing it into diaphragm compartments, a valve table, a diaphragm in each compartment, and supported at one side by the partition, a flagstaff formed of two sections out of alinement with each other, the upper section extending above the valve table and the other section wholly below the table, the lower section being in the form of a crank with its main vertical portion connected centrally with the outer plate of the diaphragm, said section being provided with short vertical portions, the upper seated in a bearing beneath the valve table and the other in a bearing on the bottom of the meter, there being connections between the flagstaff sections, whereby they are oscillated together, suitable valves on the valve table, and connections between the upper sections of the flagstaffs and the valves, whereby the valves are operated.

7. In a gas meter, in combination, a suitable casing having a partition therein dividing it into diaphragm compartments, a valve table, a flagstaff formed of an upper and a lower section out of alinement with each other, connections between two sections, whereby oscillatory movement of one will be communicated to the other, a diaphragm in each compartment, and supported by and connected to the lower section of the flagstaff, valves on the valve table, and connections between said valves and upper sections of the flagstaffs, whereby the valves are operated.

8. In a gas meter, in combination, a casing having a diaphragm therein and a valve table, a valve on said table, a flagstaff formed in two sections out of alinement with each other, connections between the two sections, whereby the oscillation of one will communicate similar movement to the other, an operating shaft, connections between said shaft and one of the flagstaff sections, whereby a rotary motion is given the shaft upon the expansion and collapse of the diaphragm, and connections between the operating shaft and the valve, whereby the flow of gas into and out of the diaphragm and casing is controlled.

In testimony whereof I affix my signature in presence of two witnesses.

GEORGE A. LANE.

Witnesses:
  GEO. D. BURNS,
  AL LINDE.